Nov. 26, 1929.                S. H. H. PARSONS                1,737,268

SHEAVE BLOCK

Filed March 12, 1928

INVENTOR.

Sylvanus H. H. Parsons
BY
John J. Thompson
ATTORNEYS.

Patented Nov. 26, 1929

1,737,268

UNITED STATES PATENT OFFICE

SYLVANUS H. H. PARSONS, OF POUGHKEEPSIE, NEW YORK

SHEAVE BLOCK

Application filed March 12, 1928. Serial No. 261,067.

This invention relates to a sheave block or similar article of that class employed on boats, yachts, etc., in the operation of the steering gear, motor controls and like uses where the block is permanently secured to a part of the boat.

In boat fittings of this kind that are now in use, the sheave wheel, sprocket or crank that is employed, is mounted in the block or housing, by a pin or bolt in a permanent manner, such as by riveting, and after the block is mounted or installed in place by being bolted or riveted to the boat, it becomes impossible to remove the sheave, either to replace worn parts, or to install a new cable if it can not be threaded through the block.

Also in cases where a pin is employed, being retained in place by a cotter pin in each end thereof, or by a nut threaded thereon, and the block is installed close up to a bulkhead or the deck planking, it is impossible to remove the pin without removing the block, and in many cases where the block is installed during the building of the boat, it becomes impossible to remove the same for repairs and renewals which are necessary from time to time. It is also well known that in most blocks the sheaves are of small diameter, the cable grooves shallow and the assembly poor, thus producing a block having a good deal of lost motion, and in steering gear, this lost motion is so great that the steering wheel requires considerable movement before the rudder will respond; this condition being very dangerous in the operation of high speed boats.

The object of the present invention is to provide a sheave block of novel design, containing few parts and those of rugged construction, yet compact and of light weight.

Another object being to construct a sheave block, in which the pin and sheave wheel are of large diameter, thus insuring long wear and ease of operation.

Still another object being to provide a sheave block that may be permanently attached to the boat in close proximity to the deck, bulkhead or other object, and in any of several positions, and yet the pin and sheave wheel may be readily removed without detaching the block from the boat.

A further object being to provide in a block of this kind, a sheave having a deep groove to prevent the cable from accidental removal should the cable become slack, and also to so construct the several parts of the block that the same are interchangeable, and by their assembly the block becomes either adaptable for right or left hand installation.

Also to provide a sheave block so constructed that after its installation, the sheave wheel may be quickly removed therefrom to insert a steering cable which has its ends thimbled and spliced.

With these and other objects in view, my invention comprises certain construction and combination of parts that will hereinafter be fully described and claimed, and which are illustrated in the accompanying drawings which form a part hereof and in which like figures of reference refer to corresponding parts in all of the views, but it is understood that slight changes may be made without departing from the spirit of the invention.

In the drawings:—

Referring to the drawings:—

Figure 1:
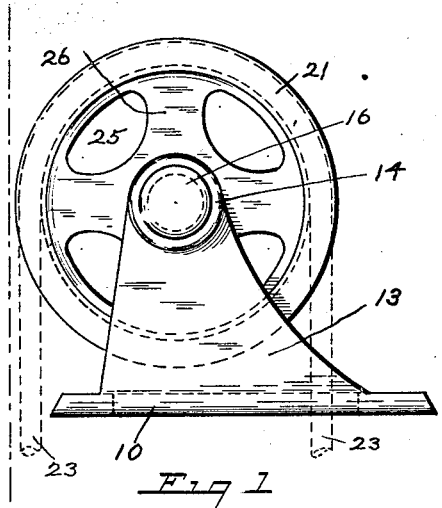
Figure 1 shows a side elevation of an upright form of the sheave block, the cable being indicated by the dotted line, and a bulkhead being indicated by the broken line.
Figure 2:
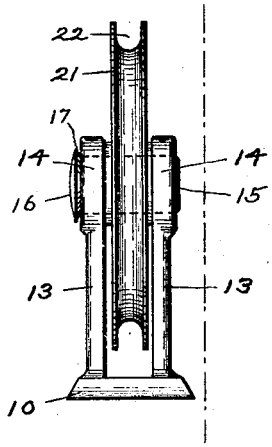
Figure 2 shows an end view of the same.
Figure 3:
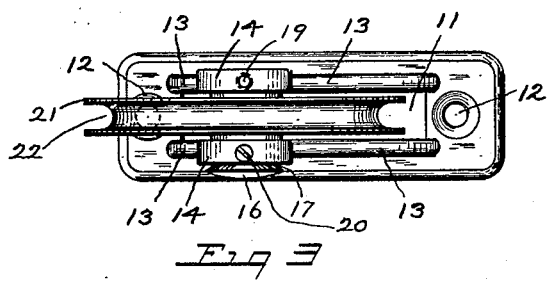
Figure 3 shows a top plan view of the same.

As shown in Figures 1 to 4 inclusive, the device comprises a block formed with a base 10, having an opening 11, and the holes 12 for the mounting means such as bolts, rivets, etc., to secure it to the boat.

Adjacent to the sides of the opening 11, and at right angles to the base 10, are formed the housing sides 13, which are here shown as integral therewith, but which may be attached thereto if desired, or said base and housing could be made of sheet metal if desired for very light construction and uses.

In the upper ends of the housing sides 13 are formed the alined bearings 14, which are of much larger diameter than usually employed for blocks of this size.

Within the alined bearings 14, is mounted a sheave pin 15, also of large diameter to provide a sliding fit with the bearings; said pin 15 being formed with a head 16 on one end thereof and the underside of said head 16 being beveled as at 17; the purpose of this being that a screw driver or other tool may be inserted between said head 16 and the side of the housing bearing 14 to force out or remove the pin 15.

Said pin 15 is also formed with a groove 18 adjacent to the head 16 and when the pin is mounted in the bearings 14, this groove 18 will register with a tapped hole 19 formed in said bearings at right angles thereto and communicating with the bore; and within the tapped hole 19 that is in registry with said groove 18, is threaded a screw 20, with its end entering said groove 18 to lock said pin 15 and prevent its removal; and it will be noted that the pin 15 may be inserted from either side of the housing, and the locking screw placed in either of the required holes; or if so desired in place of the locking screw 20, a cotter pin may be used, passing through the bearing and the pin.

On said pin 15 and between the sides of the housing 13, is mounted a sheave wheel 21, which is formed with a deep groove 22 for the cable 23; and as shown in Figure 1 this cable 23 may have one end pass the end of the base 10 and the other end pass through the opening 11 in said base.

Figure 4:
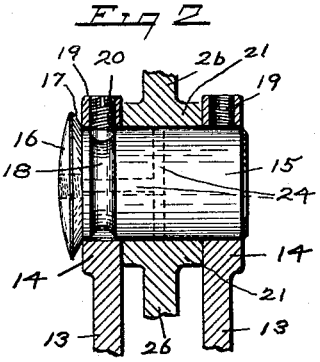
Figure 4 shows an enlarged detail sectional view of the bearings of the block and the method of mounting the pin therein.

As shown in Figure 4 the pin 15 may be provided with an oil groove or hole 24, terminating in the head 16 in an enlarged tapped hole for the attachment of an oiling device or feed pipe of an oiling system.

Figure 5:
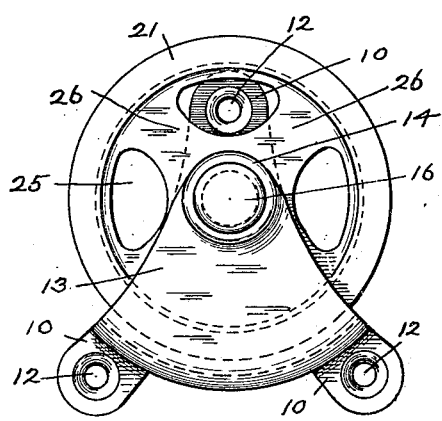
Figure 5 shows a plan view of the flat or deck type of housing.

In the construction shown in Figure 5 the base 10 is formed with the holes 12 for the attaching means, but only has one side of a housing 13, as the base forms the other side; the alined bearings 14 for the pin 15, being formed in the base 10 and the housing 13; and it will be noted that the openings 25 between the spokes 26 of the sheave wheel 21, will register with the rear attaching hole 12 of the base 10, so that the attaching means, such as a bolt or screw, may be removed through said opening 25, without removing the sheave 21 if so desired.

Having thus described my invention, what I claim as new and desire to secure by Letters Patent, is:

1. In a sheave block of the class described, comprising a housing formed with a base, and having two alined bearings in said housing, a pin adapted to be mounted in said bearings, a head formed on one end of said pin and having an angular under side, and a groove formed adjacent thereto, said housing being provided with tapped holes at right angles to and communicating with said bearings, a locking screw threaded into one of said tapped holes and adapted to enter the groove in said pin for the purpose of locking the same within said bearings, and a sheave wheel or other movement transmitting member mounted on said pin.

2. A boat fitting, comprising a housing designed to be permanently attached to a boat, said fitting formed with alined bearings, a pin reversibly mounted in said bearings, means carried by said bearings and coacting with means carried by said pin for locking the same in the bearings, means carried by said pin to facilitate its removal from said bearings, and a movement transmitting member mounted on said pin.

In testimony whereof I affix my signature.

SYLVANUS H. H. PARSONS.